United States Patent [19]

Sutton et al.

[11] Patent Number: 4,519,922

[45] Date of Patent: May 28, 1985

[54] ENVIRONMENTALLY COMPATIBLE HIGH DENSITY DRILL MUD OR BLOW-OUT CONTROL FLUID

[75] Inventors: David L. Sutton; Michael L. Walker, both of Duncan, Okla.

[73] Assignee: Halliburton Company, Duncan, Okla.

[21] Appl. No.: 477,049

[22] Filed: Mar. 21, 1983

[51] Int. Cl.³ .............................................. C09K 7/00
[52] U.S. Cl. .............................. 252/8.5 B; 252/8.5 A; 252/8.55 R
[58] Field of Search ................ 252/8.5 B, 8.55 R, 8.5

[56] References Cited

U.S. PATENT DOCUMENTS

| | | | |
|---|---|---|---|
| 2,298,984 | 10/1942 | Stinson et al. | 252/8.5 B |
| 3,498,394 | 3/1970 | Goodwin et al. | 252/8.5 A |
| 3,867,128 | 2/1975 | Hancock | 252/8.5 B |
| 4,092,407 | 5/1978 | Rohrborn et al. | 252/8.5 B |
| 4,436,681 | 3/1984 | Barczak et al. | 252/8.5 B |

OTHER PUBLICATIONS

Chem. Abstract 87: 70761u, Roehrborn, Jun. 26, 1975.

*Primary Examiner*—Theodore Morris
*Attorney, Agent, or Firm*—Thomas R. Weaver

[57] ABSTRACT

An environmentally compatible high density drilling or blow-out control fluid is provided wherein densities between twenty-four (24) and forty (40) pounds per gallon can be achieved. Such preferred fluid is aqueous based, uses a non-toxic gelling agent such as fine iron oxide powder, a coarser first weighting material such as fine iron powder, and a second still coarser weighting material such as iron shot, steel shot or mixtures thereof.

10 Claims, No Drawings

ENVIRONMENTALLY COMPATIBLE HIGH DENSITY DRILL MUD OR BLOW-OUT CONTROL FLUID

BACKGROUND OF THE INVENTION

1. Field of the Invention

This invention pertains to blow-out control fluids and drilling muds which are environmentally compatible and can achieve densities up to about forty (40) pounds per gallon (ppg) while retaining such properties necessary to provide adequate pumpability.

2. Description of the Prior Art

During the drilling of deep oil and gas wells, over-pressured (or geopressured) zones are occasionally penetrated. Since the pressure gradient of these zones seldom exceeds the hydrostatic pressure of a 2.4 density (20 ppg) heavy drilling fluid is often sufficient to control these over-pressured zones. However, such heavy drilling fluids are expensive and are often not effective where the exposed zones have a low parting pressure.

Many problems are incurred when drilling into over-pressurized zones with mud too light to hold back the gas pressure. Such resulting conditions range from gasified mud (for low permeability formations), controllable kicks which are successfully stopped by closing blow-out preventors, to uncontrollable blow-outs. To counteract the over-pressurized zones, high density fluid is pumped into the annulus (backside), drill pipe or casing (if no drill pipe is in hole). If successful, hydrostatic fluid pressure control will be established with respect to the over-pressurized zone. In the case of a blow-out, the surface or intermediate casing is often parted exposing the borehole to any proximate fresh water aquifiers. Additionally, during kill operations, there is often a danger the casing will part before control is established. Furthermore, kill operations for blow-outs are not always successful and kill fluids can be blown from the well and sprayed across the countryside. Hence, any toxic chemicals included in the high density fluid could be transmitted through the aquifier, or directly through the blow-out, to the local animal and plant population.

A variety of drilling fluids and weighting agents are presently on the market. Generally, drilling fluids have an aqueous or hydrocarbon base. One principal requirement of a good drilling fluid is that it is able to suspend a sufficient amount of weighting additives so as to meet desired density requirements particularily with respect to preventing gasification and blow-outs, while remaining pumpable. With respect to aqueous base drilling fluids, a variety of water thickeners are also known. Examples are organic materials such as xanthan gums, aluminum containing compositions, such as hydrous aluminum oxide, polyacrylates, polyacrylamides and a variety of cellulose derivatives. Examples of known weighting materials include barite, hematite, calcium carbonate and bentonite. However, combinations of the above result in weighted drilling fluids having a density of generally less than twenty (20) pounds per gallon.

Under certain conditions conventional mud systems can be weighted up to thirty (30) pounds per gallon using galena as the weighting agent. Other carrier fluids such as zinc bromide and calcium bromide can also be used to carry galena. Lead powders have also been used to increase the density of zinc bromide carrier fluids. However, when wells are in communication with an aquifier the use of any metal or soluble material considered toxic is unacceptable. Additionally, the heavy carrier fluid would not be permitted to contain soluble, transmittable bromide and zinc.

With respect to blow-out control fluids, two desired qualities are good pumpability and a sufficiently high density to equilibrate downhole pressures. In blow-out situations environmental considerations receive additional attention since there is a greater likelihood of communication with an aquifier as well as the possibility of expulsion of fluids during blow-out. The density of fluid necessary for equilibration purposes is also dependent upon the well parameters.

In the art of concrete mixing, particle size interrelationships of the cement, fine sand and coarse aggregate with regard rheology and pumpability properties are a consideration. By adjusting the sand and coarse aggregate particle size distribution, a reduction in the amount of water and cement per unit volume required for good pumpability properties can be reduced. Part of this art is referred to as gap grading. However, it was not previously known whether such principles could be applied to systems where all particles employed are generally smaller than the smallest particle of fine sand in concrete. It was generally anticipated that a point of diminishing returns was already being met with respect to the fine sand particle size.

Therefore, it is a feature of the present invention to provide an environmentally compatible high density fluid to be used in subterranean drilling or blow-out control.

SUMMARY OF THE INVENTION

This invention pertains to compositions for high density suspensions or slurries devoid of materials or chemicals which are considered to be hazardous to the environment, i.e., regarding contamination of aquifiers, land surface or air. Such composition comprises water, minute particle sized non-toxic gelling agents such as red iron oxide fines, and weighting materials such as iron powder or small iron shot, or where very high density fluids are required, i.e. over 31 ppg, combinations of gap-graded weighting materials such as iron powder and iron shot. Resultant suspensions or slurries can be achieved having densities from about 2.9 (24 ppg) to 4.8 (40 ppg), while still being readily pumpable, and showing little or no settling or segregation after remaining static for periods up to forty-eight (48) hours.

In the preferred embodiment of this invention, a very fine powder (average particle diameter 0.5 to 10.0 micrometers) of red iron oxide is used as the gelling agent to produce an aqueous suspension or slurry with good static gel strength. A first weighting material is added such as fine iron powder (average particle diameter 5–50 micrometers) same being fine enough to require only small amounts of static gel strength but large enough for the red iron oxide water suspension to act as a fine paste, slurry or gelled fluid phase. Next is included a second weighting material such as iron shot having an average diameter of 200 to 300 micrometers and being sufficiently large so that the combination of red iron oxide, iron powder and water acts as a paste or gelled fluid phase with respect to the iron shot. The rheology, including static gel strength, plastic viscosity and yield point, can be further controlled by adding small amounts of known dispersants and viscosifiers.

So that the above-recited features, advantages and objects of the invention, as well as others which will become apparent, are attained and can be understood in detail, more particular description of the invention is set forth below with respect to typical embodiments thereof, but the described embodiments should not be considered limiting of its scope, for the invention may admit to other equally effective embodiments which will be apparent from the description to one of ordinary skill in the art.

DESCRIPTION OF THE PREFERRED EMBODIMENTS

The composition of the present invention includes the first step of mixing fresh water with an environmentally compatible gelling agent having particles small enough for the particle intersurface attraction forces to have a major effect on the slurry rheology. That is to say that the gelling agent particles must be small enough to impart what is known as good static gel strength and a high yield point to the resultant fluid.

Examples of useful gelling agents are iron oxide, oxides of antimony, zinc oxide, barium oxide, barium sulfate, barium carbonate, and hematite and other iron ore. Although it is noted that by themselves, zinc, barium and antimony, might be considered environmentally incompatible, in these forms the chemicals do not tend to degrade. The desired properties of the gelling agent include sufficiently fine particle size, sufficiently high density and sufficient activity or intersurface attraction properties so as to produce a slurry having a static gel strength of at least ten (10) pounds per hundred (100) square feet.

The resultant slurry is then further weighted with the addition of other environmentally compatible weighting materials. If a single weighting material is used, such material should be coarser than the gelling agent. However, if a denser fluid is desired, it has been found that a second still coarser weighting agent can be included to provide still more improved properties with regard density.

Here it might be useful to digress and note that these fluids have particular usefulness as drill muds when fluid loss control additives such as bentonite, cellulose derivatives, polyacrylamides, polyacrylates and the like are added, while also possessing utility as blow-out control fluids. This is particularly true when higher density blow-out fluids are necessary and where environmental compatibility is of concern.

Additionally, the fluid viscosity can be better controlled using commercially available viscosifiers and dispersants, with such addition occurring either before addition of the gelling agent or at latter stage. The variety and amount of the dispersants, viscosifiers, gelling agent and weighting material used will be dictated by the well parameters. When two or more gap graded weighting agents are used, pumpable composition can be obtained with a density of up to about forty (40) pounds per gallon.

In the preferred embodiment, it has unexpectedly been found that when a fine particle gelling agent such as red iron oxide and has an average particle diameter size in the range of 0.5 to 10.0 micrometers, which is small enough for gelling water, i.e. forming a suspension or slurry with good static gel strength and yield point, such resultant fluid is capable of suspending other weighting materials suitable for use as drilling muds and blow-out control agents. For an environmentally compatible fluid, preferred weighting agents would include iron powder and iron or steel shot. The iron powder should be fine enough to require only small amounts of static gel strength but large enough for the red iron oxide water suspension to act as a fine paste or gelled fluid phase. An example of such fine iron powder would have an average particle diameter size of 5 to 50 micrometers. The resultant fine paste or gelled fluid phase is receptive to further weighting. A second desirable weighting material such as iron or steel shot having an average diameter of approximately 200 to 300 micrometers could be added to increase the density of the fluid and reduce the fluids dependency on a single weighting material.

Another unexpected finding was that gap grading of the weighting materials with respect to one another and to the particle size of the gelling agent, results in a pumpable slurry with a greatly increased solid volume/water volume ratio than with weighting materials whose particles are within a single narrow-size range. Hence, optimum results with regard density will be obtained via inclusion of a variety of sizes of weighting material.

If a single weight material is used, such material should be coarser than the gelling agent, having an average particle diameter size of two (2) to twenty (20) times greater than the average particle diameter size of the gelling agent. More specifically, the average particle diameter size of the weighting material should be such that at least ninety (90) percent of the particles are less than three (3) times the average particle diameter size of its own average particle diameter size and no more than ten (10) percent of the weight agent particles have a diameter size greater than fifteen hundreths (0.15) of its own average particle diameter size.

The preferred embodiment for a higher density fluid (i.e. a fluid achieving a density over about 31 ppg) contemplates inclusion of a second still coarser weighting material. Such second weighting material should have an average particle diameter size of four (4) to twenty (20) times greater than the average particle diameter size of the first weighting material, with no more than ten (10) percent of such second weighting material having a particle size less than fifteen hundreths (0.15) of its own average particle diameter size and with at least ninety (90) percent of such second weighting material having a particle size less than five (5) times its own average particle diameter size.

Dispersants and viscosifiers may be added to provide additional rheology control. An example of such a dispersant is CFR-2 Dispersant, commercially available from Halliburton Services. An example of an acceptable viscosifier is 150 GXR Viscosifier, which is commercially available from Hercules Incorporated. Generally, a dispersant is preferrably added to reduce friction so that turbulent flow can be achieved at lower pumping rates, as well as to reduce fluid loss. In general, it is easier to over thin the fluid in question with the dispersant and thereafter use a small amount of viscosifier to elevate the viscosity to a desired level.

This invention does not require the use of two separate weighting agents, but when reviewing the advantages of gap grading, the value of including a coarser degree of the weighting material or in the alternative two separate weighting agents of varied size is evident.

For example, if a fluid contains fine iron powder alone, the maximum density achievable in an adequately pumpable fluid would be limited to about 31 ppg. Additionally, the use of iron or steel shot alone would promote a settling problem that would prevent obtainment of the maximum density achievable with the use of at least two weighting materials of more varied size.

The following examples are given for illustrative purposes only and are not meant to be a limitation on the subject invention except as indicated by the claims appended hereto. All parts and percentages are by weight unless otherwise indicated.

EXAMPLE I

In an attempt to kill a blow-out gas well, 100 barrels of a 35-pound per gallon fluid were forced into the well followed by 900 barrels of a 25-pound per gallon fluid. These fluids were forced into the well at a rate of at least 50 barrels per minute, and were followed by a cementing stage which included 3,000 sacks of an 18–19 pound per gallon cement. Prior to the blow-out the tubing pressure of the well was about 8500 psi with a shut-in tubing pressure of about 11,000 psi.

The 25-pound per gallon fluid was mixed in batch in the following mixing sequence with the following composition per barrel.

TABLE I

| | (25 lb/gal fluid) | | |
|---|---|---|---|
| Item | Amount Per Barrel | Density g/cc | Particle Size in Micrometers |
| Water | .498 BBL | | |
| CFR-2 Dispersant | 2.5 lbs | | |
| 150 GXR Viscosifier* | .15 lbs | | |
| Red Iron Oxide | 161 lbs | 4.75 | 1.4 |
| Hi-Dense ® No. 3** Cement Weight Additive | 710 lbs | 5.02 | N/A |

*This is a hydroxyethyl cellulose derivative commercially available from Hercules Incorporated.
**Hi-Dense No. 3 cement weight additive is a hematite ore that has been ground to a graded particle-size distribution and commercially available from Halliburton Services.

The 35-pound per gallon fluid was formed by mixing in the provided sequence the following compositions which again are provided in amounts per barrel:

TABLE II

| | (35 lb/gal fluid) | |
|---|---|---|
| Item | Amount Per Barrel | Particle Size |
| Water | .46 BBL | |
| CFR-2 Dispersant | 2.75 lbs | |
| 150 GXR Viscosifer | .15 lbs | |

TABLE II-continued

| | (35 lb/gal fluid) | |
|---|---|---|
| Item | Amount Per Barrel | Particle Size |
| Red Iron Oxide with density of 4.75 g/cc | 232 lbs | 1.4 micrometers |
| Fine Iron Powder with density of 7.75 g/cc | 530 lbs | Less than 5% of the particles have a diameter size greater than 74 micrometers and no more than about 75%–85% of the particles have a particle size less than 44 micrometers. |
| Iron Shot (Grit-50) with density of 7.56 g/cc | 540 lbs | The particle diamter size of 90% of the particles is between 250 and 420 micrometers. |

The fluids were mixed by batch in two ribbon blenders providing 200 barrels of fluid per batch in the case of the 25-pound per gallon fluid and 100 barrels per batch in the case of the 35-pound per gallon fluid. The rheology of the resultant fluids was measured and is provided in Table III.

TABLE III

| | Rheology | | | | | |
|---|---|---|---|---|---|---|
| Fluid | 600* | 300 | 200 | 100 | 6 | 3 |
| 25 lb/gal | 210** | 113 | 79 | 46 | 13 | 11 |
| 35 lb/gal | 283 | 173 | 134 | 90 | 34 | 25 |

*Revolutions per minute using a Fann VG 34A meter.
**Values are in pounds per 100 square feet.

After preparation of the fluids, the 35-pound per gallon fluid was introduced into the well at a rate of about 50 barrels per minute, followed by the 25-pound per gallon fluid at a rate of 90–100 barrels per minute. At this point the well was under control and taking fluid, and was now ready for the cementing stage.

Thereafter, the well was opened and 3,000 sacks of 18–19 pounds per gallon cement were pumped at the rate of 20 barrels per minute.

EXAMPLE II

Experiments were conducted using red iron oxide as a gelling agent in an attempt to find a high density kill fluid. The data from these experiments is provided in Table IV, with results indicating that fluids having a density of 24.8 and 35.0 pounds per gallon were achieved.

TABLE IV

| Test No. | Fluid Base | Type of Solids | Conc. of Solids | Density lbs/gal | Effective Viscosity at 300 rpm | Comments |
|---|---|---|---|---|---|---|
| 1. | 4% KCL | Red Iron Oxide | 0.5 g/cc | 24.8 | 68 cps | Solids separation was detected after 15 minutes |
| | | Iron Powder | 3.0 g/cc | | | |
| 2. | water | Red Iron Oxide | 0.9 g/cc | 24.8 | 78 cps | 0.14 g/cc CFR-2 dispersant and 0.001 g/cc 150 GXR Viscosifier were added to the water to maintain viscosity |
| | | Hi-Dense ® No. 3 Additive | 3.98 g/cc | | | |
| 3. | water | Red Iron Oxide | 1.4 g/cc | 35.0 | 270 cps | 0.017 g/cc CFR-2 dispersant was was added to the |
| | | Iron Powder | 3.22 g/cc | | | |
| | | Steel | 3.3 g/cc | | | |

TABLE IV-continued

| Test No. | Fluid Base | Type of Solids | Conc. of Solids | Density lbs/gal | Effective Viscosity at 300 rpm | Comments |
|---|---|---|---|---|---|---|
| | | Shot (50 Grit) | | | | water for viscosity maintenance. |

While particular embodiments of the invention have been described, it will be understood that the invention is not limited thereto, since modifications may be made and will become apparent to those skilled in the art. For example, other environmentally inert compositions such as tungsten, manganese and tin could be substituted for the iron and steel weighting agents above.

What is claimed is:

1. A fluid suitable for use as a drilling fluid and a blow-out fluid comprising:
   (a) water
   (b) a gelling agent selected from the group consisting of oxides of antimony, zinc oxide, barium oxide, barium sulfate, barium carbonate, iron axide, hematite, other iron ores and mixtures thereof wherein said gelling agent has a physical make-up with regard to fine particle size, high density and inter-surface attration properties sufficient to create a slurry with said water that has a gel strength of at least 10 pounds per 100 square feet and said gelling agent has an average particle diameter size in the range of from about 0.5 to about 10.0 micrometers; and,
   (c) a weighting material selected from the group consisting of iron powder, hematite, other iron ores, steel shot, tungsten, tin, manganese, iron shot, and mixtures thereof wherein said weighting material has an average particle diameter size of from about 2 to about 20 times the average particle size of the gelling agent;
said fluid having a density of from 24 pounds per gallon to about 40 pounds per gallon.

2. The fluid of claim 1 wherein at least 90 percent of the particles of said weighting agent have a particle diameter size less than 3 times the average particle diameter size of said weighting agent and no more than about 10 percent of said material has a diameter size greater than about 0.15 of the average particle diameter size of the weighting material.

3. The fluid of claim 2 wherein the gelling agent is iron oxide.

4. The fluid of claim 3 wherein the iron oxide has a density of from about 4.6 to about 5.1 g/cc.

5. The fluid of claim 4 wherein the weighting material is iron powder having an average particle diameter size of from about 5 to about 50 micrometers.

6. The fluid of claim 5 further comprising a second weighting material having an average particle diameter size of from about 200 to about 300 micrometers said second weighting agent being selected from the group consisting of iron shot, steel shot, and mixtures thereof.

7. The fluid recited in claim 6 wherein said second weighting material has an average particle diameter size of from about 4 to about 20 times greater than the average particle diameter size of the first weighting material and no more than 10 percent of said second weighting material has a particle size less than 0.15 percent of the average particle diameter size of said second weighting material and at least 90 percent of said second weighting material has a particle size less than 5 times of the average particle diameter size of the second weighting material.

8. The fluid of claim 7 wherein the second weighting material is iron shot.

9. The fluid of claim 8 further comprising an amount of a dispersant effective to increase viscosity to a degree sufficient to permit said fluid to be pumped into a subterranean oil or gas formation at a speed of at least 50 barrels per minute.

10. The fluid of claim 9 further comprising a fluid loss control additive selected from the group consisting of bentonite, polyacrylamide, polyacrylate, and cellulose derivatives.

* * * * *

UNITED STATES PATENT AND TRADEMARK OFFICE
CERTIFICATE OF CORRECTION

PATENT NO. : 4,519,922
DATED : May 28, 1985
INVENTOR(S) : David L. Sutton / Michael L. Walker It is certified that error appears in the above-identified patent and that said Letters Patent is hereby corrected as shown below:

Column 6, at line 69, delete the formula "3.22 g/cc" and insert therefore --3.2 g/cc--.

Column 7, at line 23, delete the word "axide" and insert therefore --oxide--.

Column 7, at line 27, delete the word "attration" and insert therefore --attraction--.

Signed and Sealed this

Eighth Day of October 1985

[SEAL]

Attest:

DONALD J. QUIGG

Attesting Officer

Commissioner of Patents and
Trademarks—Designate